(12) United States Patent
Liu et al.

(10) Patent No.: US 10,399,125 B2
(45) Date of Patent: Sep. 3, 2019

(54) WHEEL FLANGE DRAINAGE CHANNEL CLEANING DEVICE

(71) Applicant: CITIC Dicastal CO., LTD, Qinhuangdao (CN)

(72) Inventors: Huiying Liu, Qinhuangdao (CN); Xiao Liu, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 125 days.

(21) Appl. No.: 15/801,799

(22) Filed: Nov. 2, 2017

(65) Prior Publication Data
US 2019/0022709 A1    Jan. 24, 2019

(30) Foreign Application Priority Data
Jul. 21, 2017 (CN) .......................... 2017 1 05982679

(51) Int. Cl.
*B08B 1/04* (2006.01)
*B08B 1/00* (2006.01)
*A46B 15/00* (2006.01)
*B60S 3/04* (2006.01)

(52) U.S. Cl.
CPC ............... *B08B 1/04* (2013.01); *A46B 15/00* (2013.01); *B08B 1/00* (2013.01); *B08B 1/002* (2013.01); *B60S 3/042* (2013.01)

(58) Field of Classification Search
CPC ........... A46B 15/00; B08B 1/00; B08B 1/002; B08B 1/04; B60S 3/042
See application file for complete search history.

(56) References Cited

U.S. PATENT DOCUMENTS

2016/0353873 A1* 12/2016 Xue ....................... A46B 13/02

FOREIGN PATENT DOCUMENTS

CN           108372141 A    *  8/2018

* cited by examiner

*Primary Examiner* — Marc Carlson
(74) *Attorney, Agent, or Firm* — Calfee, Halter & Griswold LLP

(57) ABSTRACT

Disclosed is a wheel flange drainage channel cleaning device, comprising a frame, lifting cylinders, guide posts, a servo motor, a lifting platform, a bearing seat, a shaft, a bearing, a rotating platform, a sleeve and the like. Four clamping cylinders move synchronously to clamp a wheel, the lifting cylinders may control ascending and descending of the lifting platform, the servo motor may control rotation of the rotating platform, and when the linear motor drives the racks to reciprocate up and down, the brushes swing left and right, so that aluminum scraps blocked in drainage channels beside the central hole and outside the central hole are easily cleaned.

2 Claims, 3 Drawing Sheets

WHEEL FLANGE DRAINAGE CHANNEL CLEANING DEVICE

CROSS-REFERENCE TO RELATED APPLICATIONS

This application claims priority to Chinese Patent Application No. 201710598267.9 filed on Jul. 21, 2017, which is hereby incorporated by reference in its entirety.

TECHNICAL FIELD

The present application relates to the field of cleaning technology, specifically to a wheel aluminum scrap cleaning device.

BACKGROUND ART

The aluminum alloy wheel is provided with a flange weight reduction pit and a flange drainage channel in a flange face, one end of the flange drainage channel communicates with a central hole of the wheel, the other end of the flange drainage channel communicates with the outer edge of the flange face, the drainage channel is narrow and deep, a large amount of aluminum scraps which are generally strip-shaped, block-shaped and curly are generated in high-speed rotation of the wheel during machining, and these aluminum scraps easily splatter and are just blocked in the flange drainage channel. Since the drainage channel is narrow and deep, once the aluminum scraps are blocked, they are difficult to drop naturally and remain in the flange drainage channel. When manual operation is adopted for machining, if an operator discovers aluminum scraps blocked in the flange drainage channel, he would manually clean them. However, with the improvement on automation level, production lines of manipulators' automatic operation are gradually replacing the manual operation. As for a full-manipulator automatic production line, if aluminum scraps are blocked in the flange drainage channel, the aluminum scraps remain all the time in the absence of inspection of manipulators and manual cleaning of operators and finally result in rejects after coating, and even the rejects are circulated to customers to cause complaints.

SUMMARY OF THE INVENTION

The present application is to provide a wheel flange drainage channel cleaning device, thereby meeting the requirement of an automatic production line and automatically cleaning aluminum scraps blocked in flange drainage channels.

In order to fulfill the above aim, the present application adopts the following technical solution: a wheel flange drainage channel cleaning device comprises a frame, lifting cylinders, guide posts, a servo motor, a lifting platform, a bearing seat, a shaft, a bearing, a rotating platform, a sleeve, a linear motor, fixed supports, clamping cylinders, guide rails, sliding blocks, clamping jaws, brushes, gears, rotating shaft supports, racks and a rack base.

The guide rails are mounted onto the fixed supports, the sliding blocks are mounted onto the guide rails, the clamping jaws are mounted on the sliding blocks, the clamping cylinders are connected with the sliding blocks, and the four clamping cylinders move synchronously to clamp a wheel.

The lifting cylinders are fixed on the frame, the output ends of the lifting cylinders are connected with the lifting platform, and the lifting cylinders can control ascending and descending of the lifting platform under the guiding effect of the four guide posts.

The servo motor is mounted on the lifting platform, the output end of the servo motor is connected with the rotating platform via the shaft, and the servo motor can control rotation of the rotating platform.

The sleeve is fixed on the rotating platform, the linear motor is arranged inside the sleeve, the linear motor is fixed on the rotating platform, the output end of the linear motor is connected with the rack base, the racks are mounted on the rack base, the rotating shaft supports are mounted at the top of the sleeve, both the brushes and the gears are fixed on rotating shafts of the rotating shaft supports, and the brushes can rotate along with rotation of the gears under the action of engagement of the gears and the racks. When the linear motor drives the racks to reciprocate up and down, the brushes swing left and right.

When the racks move up, both the left brush and the right brush produce rotating torque for cleaning from a central hole to the outer sides of flanges, so that aluminum scraps blocked in drainage channels beside the central hole are easily cleaned; and when the racks move down, both the left brush and the right brush produce rotating torque for cleaning from the outer sides of the flanges to the central hole, so that aluminum scraps blocked in the drainage channels outside the flanges are easily cleaned. The brushes can realize circumferential cleaning while radial cleaning, thereby effectively ensuring cleaning of all the drainage channels.

The working process of the device is as follows: firstly, a hub arrives above the device via a roller bed, and the clamping cylinders are started to clamp the hub; secondly, the lifting cylinders are started to drive the lifting platform to ascend, and the brushes don't stop till entering one of flange drainage channels; thirdly, the linear motor is started to drive the racks to reciprocate up and down, the brushes swing left and right to clean the flange drainage channel, meanwhile, the servo motor is started to drive the rotating platform to rotate at a low speed, and all the flange drainage channels can be cleaned while the rotating platform rotates one circle; and finally, the lifting platform descends and is reset, the clamping jaws are loosened, the roller bed rotates to take the hub away and waits for next hub at the same time, and so on.

The device of the present application may meet the requirement of an automatic wheel production line, may effectively and automatically clean aluminum scraps blocked in the flange drainage channels, and has the characteristics of compact structure, stability, high efficiency, simple operation and the like.

Figure 1:
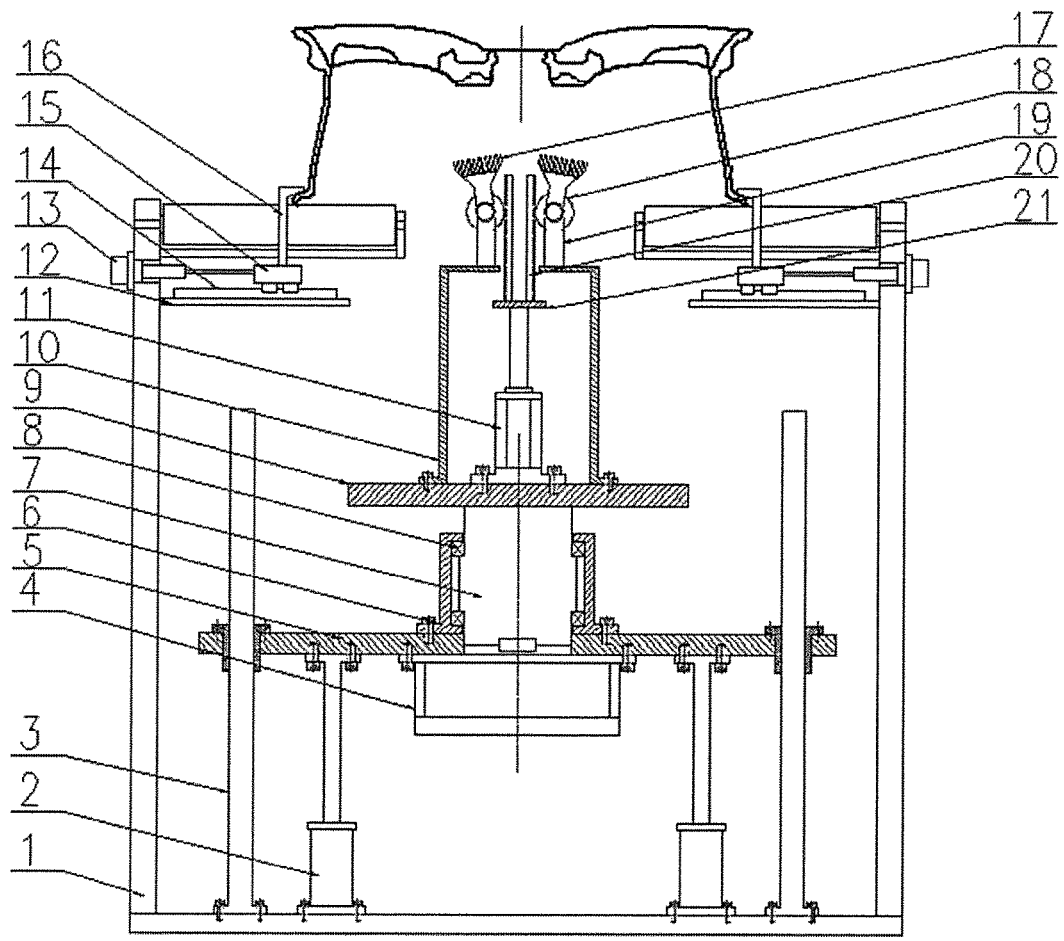
FIG. 1 is a front view of a wheel flange drainage channel cleaning device of the present application.
Figure 2:
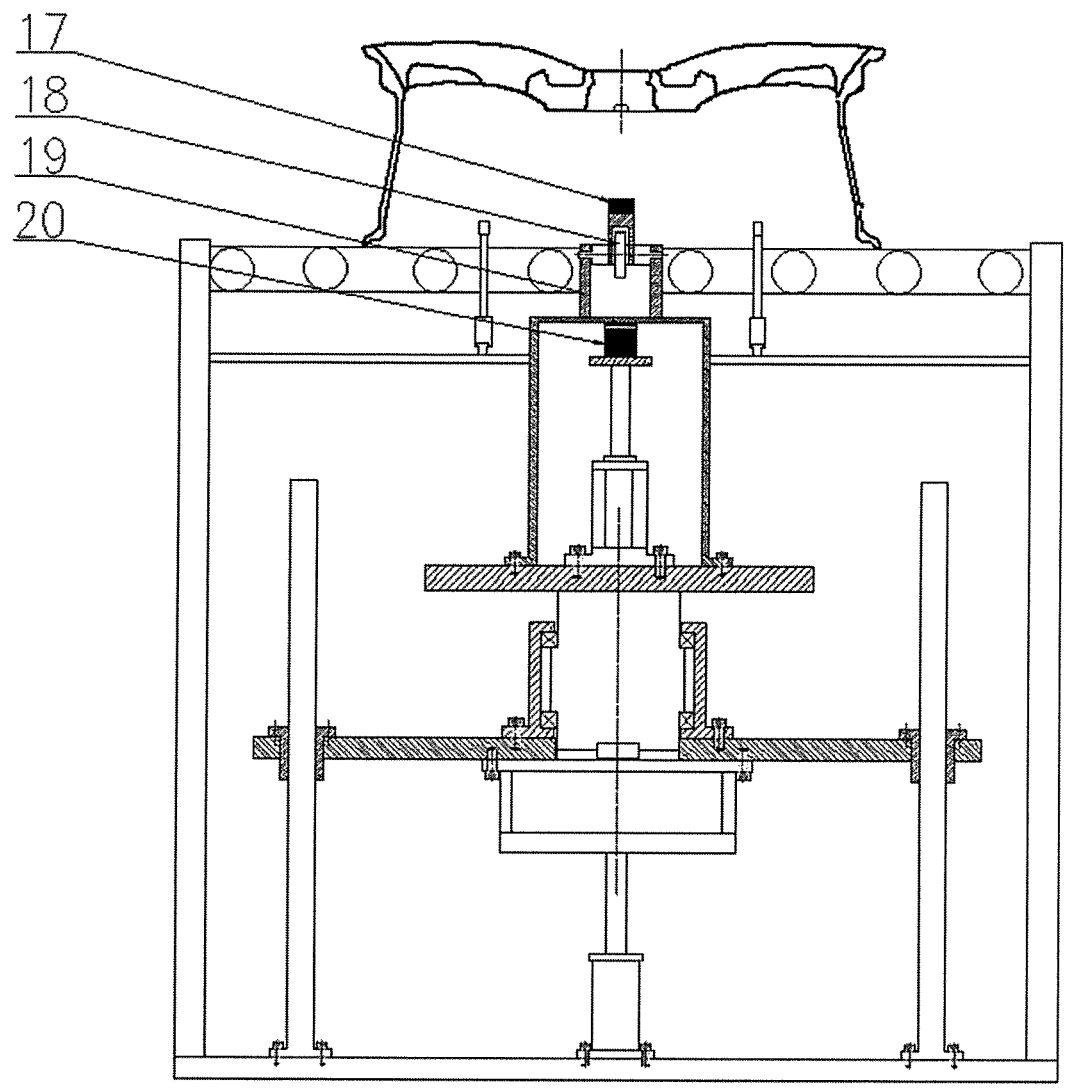
FIG. 2 is a left view of the wheel flange drainage channel cleaning device of the present application.
Figure 3:
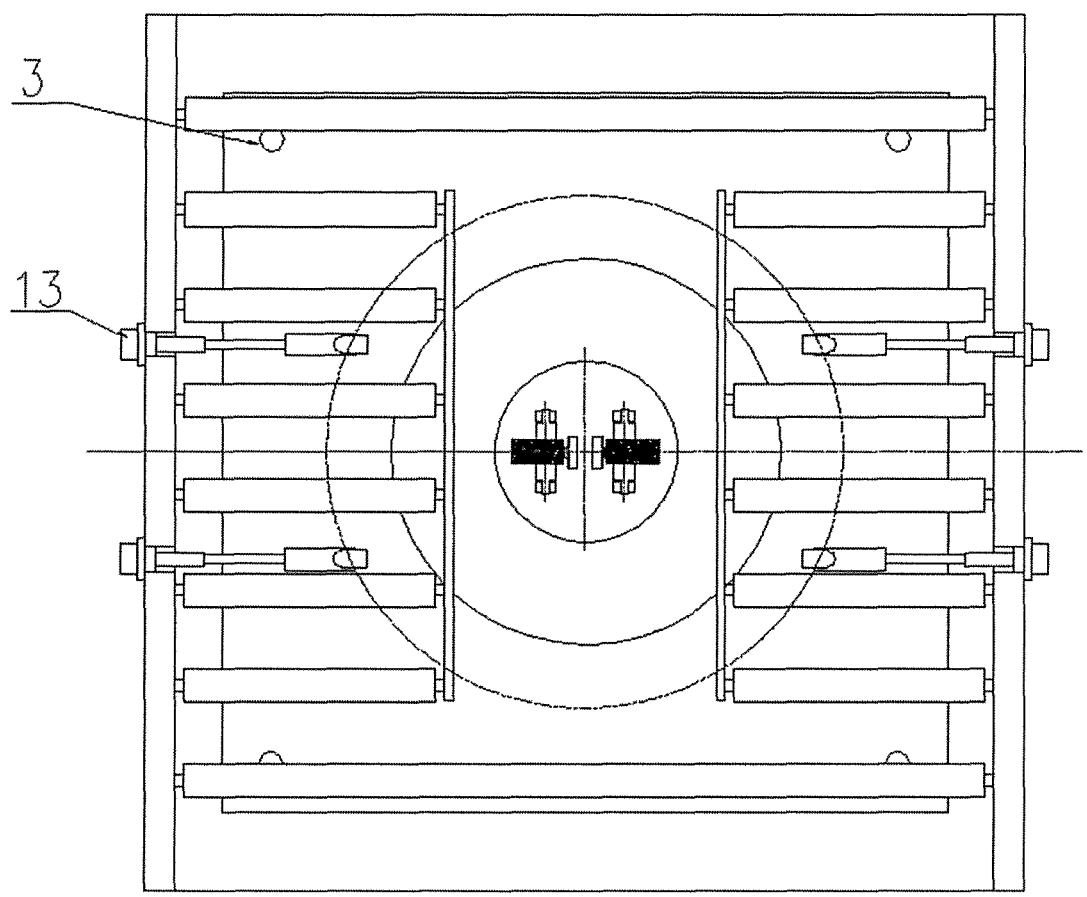
FIG. 3 is a top view of the wheel flange drainage channel cleaning device of the present application.

In figures: 1—frame, 2—lifting cylinder, 3—guide post, 4—servo motor, 5—lifting platform, 6—bearing seat, 7—shaft, 8—bearing, 9—rotating platform, 10—sleeve, 11—linear motor, 12—fixed support, 13—clamping cylinder, 14—guide rail, 15—sliding block, 16—clamping jaw, 17—brush, 18—gear, 19—rotating shaft support, 20—rack, 21—rack base.

DETAILED DESCRIPTION OF THE INVENTION

Specific details and working conditions of a device provided by the present application will be given below in combination with the accompanying drawings.

A wheel flange drainage channel cleaning device comprises a frame 1, lifting cylinders 2, guide posts 3, a servo motor 4, a lifting platform 5, a bearing seat 6, a shaft 7, a bearing 8, a rotating platform 9, a sleeve 10, a linear motor 11, fixed supports 12, clamping cylinders 13, guide rails 14, sliding blocks 15, clamping jaws 16, brushes 17, gears 18, rotating shaft supports 19, racks 20 and a rack base 21.

The guide rails 14 are mounted onto the fixed supports 12, the sliding blocks 15 are mounted onto the guide rails 14, the clamping jaws 16 are mounted on the sliding blocks 15, the clamping cylinders 13 are connected with the sliding blocks 15, and the four clamping cylinders 13 move synchronously to clamp a wheel.

The lifting cylinders 2 are fixed on the frame 1, the output ends of the lifting cylinders 2 are connected with the lifting platform 5, and the lifting cylinders 2 can control ascending and descending of the lifting platform 5 under the guiding effect of the four guide posts 3.

The servo motor 4 is mounted on the lifting platform 5, the output end of the servo motor 4 is connected with the rotating platform 9 via the shaft 7, and the servo motor 4 can control rotation of the rotating platform 9.

The sleeve 10 is fixed on the rotating platform 9, the linear motor 11 is arranged inside the sleeve 10, the linear motor 11 is fixed on the rotating platform 9, the output end of the linear motor 11 is connected with the rack base 21, the racks 20 are mounted on the rack base 21, the rotating shaft supports 19 are mounted at the top of the sleeve 10, both the brushes 17 and the gears 18 are fixed on rotating shafts of the rotating shaft supports 19, and the brushes 17 can rotate along with rotation of the gears 18 under the action of engagement of the gears 18 and the racks 20. When the linear motor 11 drives the racks 20 to reciprocate up and down, the brushes 17 swing left and right. When the racks move up, both the left brush and the right brush produce rotating torque for cleaning from a central hole to the outer sides of flanges, so that aluminum scraps blocked in drainage channels beside the central hole are easily cleaned; and when the racks move down, both the left brush and the right brush produce rotating torque for cleaning from the outer sides of the flanges to the central hole, so that aluminum scraps blocked in the drainage channels outside the flanges are easily cleaned. The brushes can realize circumferential cleaning while radial cleaning, thereby effectively ensuring cleaning of all the drainage channels.

The working process of the device is as follows: firstly, a hub arrives above the device via a roller bed, and the clamping cylinders 13 are started to clamp the hub; secondly, the lifting cylinders 2 are started to drive the lifting platform 5 to ascend, and the brushes 17 don't stop till entering one of flange drainage channels; thirdly, the linear motor 11 is started to drive the racks 20 to reciprocate up and down, the brushes 17 swing left and right to clean the flange drainage channel, meanwhile, the servo motor 4 is started to drive the rotating platform 9 to rotate at a low speed, and all the flange drainage channels can be cleaned while the rotating platform 9 rotates one circle; and finally, the lifting platform 5 descends and is reset, the clamping jaws 16 are loosened, the roller bed rotates to take the hub away and waits for next hub at the same time, and so on.

The device of the present application may meet the requirement of an automatic wheel production line, may effectively and automatically clean aluminum scraps blocked in the flange drainage channels, and has the characteristics of compact structure, stability, high efficiency, simple operation and the like.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel flange drainage channel cleaning device, comprising a frame, lifting cylinders, guide posts, a servo motor, a lifting platform, a bearing seat, a shaft, a bearing, a rotating platform, a sleeve, a linear motor, fixed supports, clamping cylinders, guide rails, sliding blocks, clamping jaws, brushes, gears, rotating shaft supports, racks and a rack base, wherein the guide rails are mounted onto the fixed supports, the sliding blocks are mounted onto the guide rails, the clamping jaws are mounted on the sliding blocks, the clamping cylinders are connected with the sliding blocks, and the clamping cylinders move synchronously to clamp a wheel, the lifting cylinders are fixed on the frame, the output ends of the lifting cylinders are connected with the lifting platform, and the lifting cylinders are configured to control ascending and descending of the lifting platform under the guiding effect of the four guide posts; and the servo motor is mounted on the lifting platform, the output end of the servo motor is connected with the rotating platform via the shaft, and the servo motor is configured to control rotation of the rotating platform, and wherein the brushes are in contact with the wheel flange drainage channel of the wheel when the lifting platform is fully ascended.

2. The wheel flange drainage channel cleaning device according to claim 1, wherein the sleeve is fixed on the rotating platform, the linear motor is arranged inside the sleeve, the linear motor is fixed on the rotating platform, the output end of the linear motor is connected with the rack base, the racks are mounted on the rack base, the rotating shaft supports are mounted at the top of the sleeve, both the brushes and the gears are fixed on rotating shafts of the rotating shaft supports, and the brushes are configured to rotate along with rotation of the gears under the action of engagement of the gears and the racks; and when the linear motor drives the racks to reciprocate up and down, the brushes swing left and right.

\* \* \* \* \*